United States Patent
Jacobs et al.

(10) Patent No.: US 11,419,346 B2
(45) Date of Patent: Aug. 23, 2022

(54) EDIBLE AERATED WATER-IN-OIL EMULSIONS

(71) Applicant: UPFIELD EUROPE B.V., Rotterdam (NL)

(72) Inventors: Renate Gemma Jacobine Maria Jacobs, Delft (NL); Sergey Michailovich Melnikov, Hamburg (DE); Theodorus Stam, Vlaardingen (NL)

(73) Assignee: UPFIELD EUROPE B.V., Rotterdam (NL)

( * ) Notice: Subject to any disclaimer, the term of this patent is extended or adjusted under 35 U.S.C. 154(b) by 101 days.

(21) Appl. No.: 15/518,631

(22) PCT Filed: Oct. 9, 2015

(86) PCT No.: PCT/EP2015/073352
§ 371 (c)(1),
(2) Date: Apr. 12, 2017

(87) PCT Pub. No.: WO2016/058915
PCT Pub. Date: Apr. 21, 2016

(65) Prior Publication Data
US 2017/0231242 A1 Aug. 17, 2017

(30) Foreign Application Priority Data
Oct. 17, 2014 (EP) .................................... 14189337

(51) Int. Cl.
*A23D 7/01* (2006.01)
*A23D 7/02* (2006.01)
*A23D 7/005* (2006.01)

(52) U.S. Cl.
CPC ........... *A23D 7/013* (2013.01); *A23D 7/0056* (2013.01); *A23D 7/02* (2013.01)

(58) Field of Classification Search
CPC ......... A23D 7/013; A23D 7/0056; A23D 7/02
See application file for complete search history.

(56) References Cited

U.S. PATENT DOCUMENTS

| 2,913,342 A | 11/1959 | Cameron et al. |
| 3,682,656 A * | 8/1972 | Wilton ................. A23D 7/0053 426/603 |

(Continued)

FOREIGN PATENT DOCUMENTS

| EP | 0375238 | 10/1991 |
| EP | 1651338 | 5/2006 |

(Continued)

OTHER PUBLICATIONS

IPRP in PCTEP2015073352, Mar. 7, 2017.

(Continued)

*Primary Examiner* — Cephia D Toomer
(74) *Attorney, Agent, or Firm* — Arentfox Schiff LLP

(57) ABSTRACT

Process to manufacture edible aerated water-in-oil emulsion comprising: from 0.5 to 50 wt. % of micronized fat powder comprising hardstock fat; from 10 to 85 wt. % of liquid oil; from 10 to 85 wt. % of water-phase; from 2 to 100 vol. % of gas-phase; wherein the gas has an average solubility in water at 20 degrees Celsius and at 1 bar of pressure of at most 0.75 gram gas per kg water; and wherein the gas has an average solubility in sunflower oil at 20 degrees Celsius and at 1 bar of pressure of at most 0.75 gram gas per kg oil; comprising the step of: mixing the fat powder, the liquid oil, the water-phase and the gas-phase to provide the edible aerated water-in-oil emulsion.

18 Claims, 1 Drawing Sheet

(56) References Cited

U.S. PATENT DOCUMENTS

| | | | | |
|---|---|---|---|---|
| 3,796,815 | A | * | 3/1974 | Lincklaen .............. A23D 7/003 426/604 |
| 4,874,626 | A | | 10/1989 | Castenmiller et al. |
| 2006/0280855 | A1 | | 12/2006 | Van Den Berg et al. |
| 2008/0118624 | A1 | * | 5/2008 | Boer ...................... A23D 7/001 426/607 |
| 2008/0193628 | A1 | * | 8/2008 | Garbolino ............ A23D 7/0056 426/603 |
| 2009/0142467 | A1 | | 6/2009 | Aldred et al. |
| 2012/0052180 | A1 | | 3/2012 | Esteve et al. |
| 2015/0327565 | A1 | * | 11/2015 | Aldred ................. A23D 7/0053 426/564 |

FOREIGN PATENT DOCUMENTS

| | | |
|---|---|---|
| EP | 2052628 | 4/2009 |
| GB | 875902 | 8/1961 |
| GB | 1341964 | 12/1973 |
| GB | 2293828 | 1/1998 |
| JP | 55007007 | 1/1980 |
| JP | 3053846 | 3/1991 |
| WO | WO9412063 | 6/1994 |
| WO | WO2005014158 | 2/2005 |
| WO | WO2010069751 | 6/2010 |
| WO | WO2010112835 | 10/2010 |
| WO | WO2012041682 | 4/2012 |
| WO | WO2013079279 | 6/2013 |
| WO | WO2013149816 | 10/2013 |
| WO | WO2014139762 | 9/2014 |
| WO | WO2016058915 | 4/2016 |

OTHER PUBLICATIONS

Margarines and Shortenings, Ullmanns Encyclopedia of Industrial Chemistry, 1990, pp. 156-158, vol. A16.
Marszall, Leszek, Messungen des effektiven HLB-Wertes nichtionogener Tenside mittels Phenol-Titrationsmethode, Parfumerie und Kosmetik, 1979, pp. 444-448—no translation, vol. 60.
Neumuller, Franck'sce Verlagshandlung, Stuttgart, Rompps Chemie-Lexikon, 1983, pp. 1750-1751, 8th Edition.
P. Munuklu et al., Particle formation of edible fats using the supercritical melt micronization process (ScMM), The Journal of Supercritical Fluids, 2007, pp. 181-190, vol. 43, Elsevier.
Search Report in EP14189337, dated Apr. 23, 2015.
Search Report in PCTEP2015073352, dated Jan. 19, 2016.
Written Opinion 1 in PCTEP2015073352, dated Jan. 19, 2016.
Written Opinion 2 in PCTEP2015073352, dated Sep. 21, 2016.
Written Opinion in EP14189337, dated Apr. 23, 2015.

* cited by examiner

EDIBLE AERATED WATER-IN-OIL EMULSIONS

FIELD OF INVENTION

The present invention relates to a process for the manufacture of edible aerated water-in-oil emulsions. The invention further relates to the edible aerated water-in-oil emulsions obtainable by said process.

BACKGROUND OF INVENTION

Edible water-in-oil emulsions (W/O emulsions) like margarine and (low-fat) spreads are well known food products that comprise a continuous fat-phase and a dispersed water-phase.

Margarine is generally defined as a composition containing at least 80 wt. % of fat and about 20 wt. % of a water phase. In contrast, emulsions containing less than 80 wt. % of fat are generally called spreads. Nowadays the terms margarine and spread are often used interchangeably although in some countries the commercial use of the term margarine is subject to certain regulatory requirements. The main difference between margarine and spread is the amount of fat. For the purpose of the present invention the terms margarine and spread are used interchangeably.

The fat-phase of margarine and similar edible W/O emulsions comprise a mixture of liquid oil (i.e. fat that is liquid at ambient temperature) and fat which is solid at ambient temperature. The solid fat, also called structuring fat or hardstock fat, serves to structure the fat phase by forming a fat crystal network throughout the continuous oil-phase. This also helps to stabilize the water-phase and can for example reduces coalescence of the water droplets and the separation of the (heavier) water phase from the fat phase.

Important quality aspects of edible W/O emulsions are hardness, spreadability and stability. An important indication of stability is the ability to withstand temperature cycling. Temperature cycling means that the product is subjected to (cycles of) low and high temperatures. Such stability is important as consumers often subject such products to temperature cycles of storage as cold temperatures (e.g. in the refrigerator) and use at ambient temperature (which depending on the season and the country can be high). An emulsion of lower stability for example can show a larger increase in the average droplet size and/or droplet size distribution as a result of temperature cycling.

A general process for the manufacture of water-in-oil emulsions is the votator or churn process, which encompasses the following steps:
1. Mixing of the liquid oil, the hardstock fat and if present the water-phase at a temperature at which the hardstock fat is definitely liquid;
2. cooling of the mixture under high shear to induce crystallization of the hardstock fat and to create a W/O emulsion;
3. formation of a fat crystal network to stabilize the resulting emulsion and give the product some degree of firmness;
4. modification of the crystal network to produce the desired firmness, confer plasticity and (in some cases further) reduce the water droplet size.

These steps are usually conducted in a process that involves apparatus that allow heating, cooling and mechanical working of the ingredients, such as the churn process or the votator process. The churn process and the votator process are described in the Ullmann's Encyclopedia of Industrial Chemistry, Fifth Edition, Volume A 16, pages 156-158.

Health conscious consumers nowadays desire edible W/O emulsions with a reduced amount of fat, calories and/or saturated fatty acids (SAFAs) per serving. In addition there is an ongoing need of manufactures to reduce costs. One way this can be achieved is by aerating W/O emulsions with a suitable amount of gas.

EP 375 238 A2 discloses aerated fatty composition containing at least 5 wt %. The examples disclose the use of sucrose octa-esters and sucrose hepta-esters. The fatty composition may be used as a table spread, albeit not in the form of an emulsion, but as a water-free spread.

EP2052628 discloses a method to improve the overrun of aerated W/O emulsions, which involves the use of hydrophobins. In particular, the use of hydrophobins reduces the appearance of disproportionate and coalesced gas bubbles.

U.S. Pat. No. 4,874,626 relates to edible plastified products comprising a continuous fat phase and a dispersed gas phase, which are subjected to solid or liquid filling, wherein control of the amount of dispersed gas in the end product is improved. The problem is addressed by use of a dispersed gas phase comprising 10 to 100 vol. % of helium.

Some consumers consider the consumption of non-natural (synthetic) ingredients such as sugar fatty acid esters and hydrophobins as unhealthy. Therefore, the presence of such ingredients in aerated W/O emulsions can lead to reduced consumer acceptance. Also the consumption of sugar fatty acid esters has been associated with digestibility problems (e.g. anal leakage) and thus have low consumer acceptance on this account as well.

Furthermore, it was found that there is a desire to further improve the properties of aerated W/O emulsions and in particular their stability, firmness and/or appearance. For example it was observed that after production, and in particular after temperature cycling, the firmness could be undesirably low and/or the water- and/or gas-phase unstable. Like an unstable water-phase, an unstable gas-phase can be indicated by an increased average gas bubble size and/or an increased gas bubble size distribution. Furthermore, it was observed that the visual appearance of a W/O emulsion can be negatively affected by aeration and become very coarse in appearance (whereas a smooth surface structure is desirable).

It is an object of the present invention to provide edible aerated water-in-oil emulsions having improved stability, firmness and/or appearance.

It is a further object of the present invention to provide edible aerated water-in-oil emulsions having improved stability, firmness and/or appearance, wherein preferably little or no hydrophobins and/or sugar fatty acid esters are present.

SUMMARY OF THE INVENTION

One or more of the above objectives is achieved by a process for the manufacture of edible aerated W/O emulsions using micronized fat powder comprising hardstock fat and a specific type of gas for aeration.

Therefore, the invention relates in a first aspect to process to manufacture edible aerated water-in-oil emulsion comprising:
from 0.5 to 50 wt. % of micronized fat powder comprising hardstock fat;
from 10 to 85 wt. % of liquid oil;
from 10 to 85 wt. % of water-phase;
from 2 to 100 vol. % of gas-phase;

wherein the gas has an average solubility in water at 20 degrees Celsius and at 1 bar of pressure of at most 0.75 gram gas per kg water; and
wherein the gas has an average solubility in sunflower oil at 20 degrees Celsius and at 1 bar of pressure of at most 0.75 gram gas per kg oil;
comprising the step of:
a) mixing the fat powder, the liquid oil, the water-phase and the gas-phase to provide the edible aerated water-in-oil emulsion.

It was surprisingly found that aerated W/O emulsions made according to the invention have an improved stability, an improved firmness (also known as hardness), an improved spreadability and an approved appearance, compared to:
edible aerated W/O emulsions made using the votator process.
edible aerated W/O made using food-grade gas not according to the invention, such as carbon dioxide.

The invention relates in a second aspect to an edible aerated water-in-oil emulsion obtainable by the process according to the invention. As mentioned such emulsion made according to the invention show improved properties, although they may be of an overall similar ingredient composition as prior art emulsions.

Figure 1:
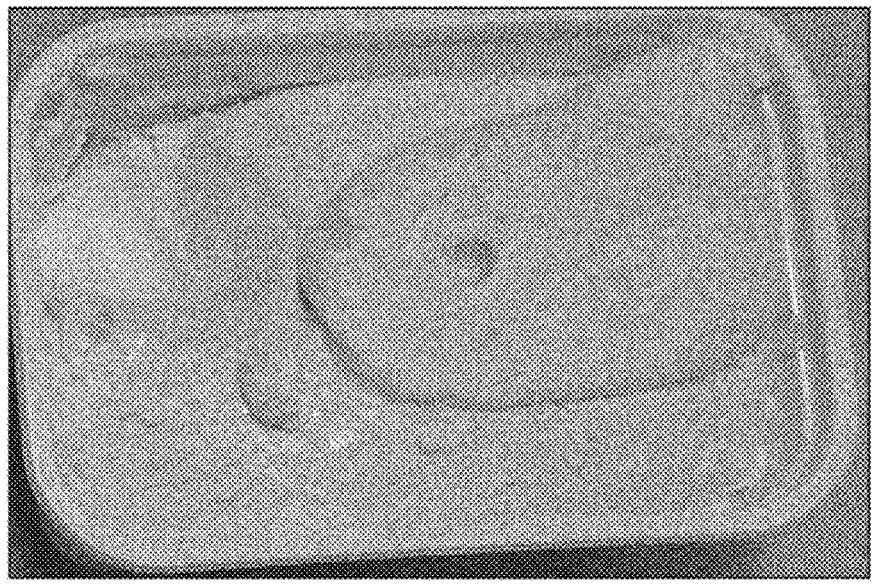
FIG. 1: Edible aerated water-in-oil emulsion (according to Comparative D), which has an improved surface appearance and is free of visible cracks.
Figure 2:
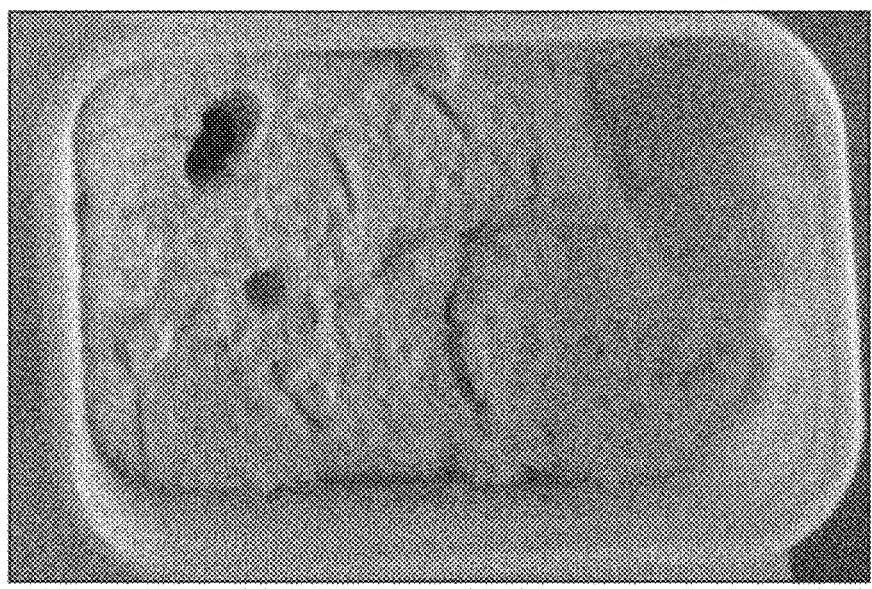
FIG. 2: Edible aerated water-in-oil emulsion (according to Comparative C), which has a very coarse (non-smooth) surface with visible cracks and other deformations.

Note that in the spreads of FIGS. 1 and 2, a scoop (upper corner) and circular stab-samples are also visible, which were taken for further analysis. These features are ignored in the evaluation of the surface appearance.

DETAILED DESCRIPTION OF THE INVENTION

Weight percentage (wt. %) is based on the total weight of the product unless otherwise stated. It will be appreciated that the total weight amount of ingredients will not exceed 100 wt. % of the total weight of the product.

The terms 'fat' and 'oil' are used interchangeably. Where applicable the prefix 'liquid' or 'solid' is added to indicate if the fat or oil is liquid or solid at ambient temperature as understood by the person skilled in the art. Ambient temperature is considered to be a temperature of 20 degrees Celsius. Hardstock fat refers to a fat that is solid at ambient temperature as understood by the person skilled in the art.

Fat as used in the present invention refers to edible triglyceride based fat as understood by the person skilled in the art. The terms 'triacylglycerols', 'TAGs', and 'triglycerides' are used interchangeably; they refer to esters of glycerol and three fatty acids. The fatty acid (moieties) of the TAGs may vary in length. The length of a fatty acid is commonly indicated by their carbon number. The fatty acid (moieties) may be saturated, monounsaturated or polyunsaturated.

The terms 'water-in-oil emulsion' and 'W/O emulsion' are used interchangeably.

Micronized Fat Powder Comprising Hardstock Fat

The fat powder used in the process according to the invention is micronized fat powder comprising hardstock fat. The micronized fat powder particles have a microporous structure of submicron size particles, as described in WO2005/014158. The thickness of the platelets (or the wall thickness of the bubbles) preferably is on average from 0.01-0.5 micrometer, more preferably 0.03 to 0.2 micrometer and even more preferably from 0.06 to 0.12 micrometer.

Suitable methods to prepare the micronized fat powder include for example Super Critical Melt Micronisation (ScMM), also known as particles from gas saturated solutions (PGSS). This is a commonly known method and is for example described in J. of Supercritical Fluids 43 (2007) 181-190, EP1651338 and WO2005/014158.

The process according to the invention is especially beneficial when used with micronized fat powder that has been prepared using a ScMM process. Preferably the micronized fat powder used in the process according to the invention is micronized fat powder obtainable by supercritical melt micronisation.

Preferably the amount of micronized fat powder used in the process according to the invention is from 1 to 20 wt. %, more preferably from 2 to 15 wt. % and even more preferably from 3 to 10 wt. %.

The micronized fat-powder preferably comprises at least 80 wt. %, more preferably at least 90 wt. %, even more preferably at least 95 wt. % and still even more preferably at least 98 wt. % of hardstock fat. Still even more preferably the edible fat-powder essentially consists of hardstock fat.

The hardstock fat may be of vegetable, animal or marine origin. The hardstock may comprise conventional oils and fats which may be of both animal and vegetable origin. Examples of sources of conventional oils and fats include coconut oil, palm kernel oil, palm oil, marine oils, lard, tallow fat, butter fat, soybean oil, safflower oil, cotton seed oil, rapeseed oil, poppy seed oil, corn oil, sunflower oil, olive oil, algae oil and blends thereof. For the purpose of this invention, algae oils are considered vegetable oils.

Preferably at least 50 wt. % of the hardstock fat (based on total amount of hardstock fat) is of vegetable origin, more preferably at least 70 wt. %, even more preferably at least 80 wt. %, still even more preferably at least 90 wt. % and still even more preferably at least 95 wt. %. Still even more preferably the hardstock fat essentially consists of hardstock fat of vegetable origin. Preferably the hardstock fat comprises or essentially consists of fat derived from palm fat, allanblackia, pentadesma, shea butter, coconut oil, soybean oil, rapeseed oil, dairy fat or any combination thereof.

The hardstock fat may be modified fat, such as fat which is produced by fractionation, hydrogenation and/or interesterification. In particular fractionation and hydrogenation can be used to alter the melting profile and N-line profile of a fat. Preferably the edible aerated W/O emulsion of the invention comprises hardstock fat which does not contain partially hydrogenated fats.

Preferably the hardstock fat comprised by the fat-powder has a solid fat content
N10 from 50 to 100,
N20 from 26 to 95, and
N35 from 5 to 60;

Still even more preferably the hardstock fat is an interesterified mixture of 65% dry fractionated palm oil stearin with an Iodine Value of 14 and 35% palm kernel oil or coconut oil.

It is important that the fat powder is not subjected to temperatures at which the hardstock fat melts as this may severely reduce the ability of the hardstock fat to provide the improved properties of the aerated W/O emulsion according to the invention. The temperature at which the hardstock fat melts depends on the hardstock fat as used and can routinely be determined for example based on the solid fat content profile (i.e. N-lines) of the hardstock fat.

Liquid Oil

The liquid oil used in the process according to the invention may be single oil or a mixture of different oils. Preferably at least 50 wt. % of the oil, based on total amount of oil, more preferably at least 70 wt. %, even more preferably at least 80 wt. %, still even more preferably at least 90 wt. % and still even more preferably at least 95 wt. %, is of vegetable origin. Still even more preferably the oil essentially consists of oil of vegetable origin. The liquid oil preferably comprises unmodified vegetable oil such as soybean oil, sunflower oil, linseed oil, low erucic rapeseed oil (canola oil), corn oil (maize oil), olive oil, algae oil and blends of vegetable oils. For the purpose of this invention algae oil is considered vegetable oil.

The amount of liquid oil used in the process according to the invention preferably is from 15 to 70 wt. %, more preferably from 18 to 60 wt. %, even more preferably from 20 to 50 wt. % and still even more preferably from 25 to 40 wt. %.

Preferably the total amount of fat (e.g. the sum of liquid oil and hardstock fat) used in the process according to the invention is from 15 to 90 wt. %, more preferably from 25 to 70 wt. % and even more preferably from 35 to 65 wt. %.

Aeration and Overrun

The term "aerated" means that gas has been intentionally incorporated into a product, for example by mechanical means. The term 'aeration' is not limited to aeration using 'air', but encompasses aeration (i.e. gasification) with other gases as well.

The extent of aeration can be measured in terms of overrun (expressed in %) or as volume fraction gas (expressed as vol. %).

The overrun is the increase in volume of an aerated composition (Vtotal) as a percentage compared to the initial volume (Vinitial) of the composition before aeration, and is described with the use of:

$$OV = \text{overrun} = \frac{V_{total} - V_{initial}}{V_{initial}} * 100\% \quad (1)$$

Overrun or volume fraction of gas is measured at (standard) atmospheric pressure and at ambient temperature, unless otherwise indicated.

The volume fraction of gas ($\Phi$) in an aerated composition (expressed in vol. %) is determined by:

$$\Phi = 1 - \frac{m_F}{m_{SUS}} \quad (2)$$

Wherein $m_{SUS}$ is the weight per volume of the unaerated composition, and $m_F$ the weight per volume of the aerated composition.

The overrun of an aerated composition and the volume fraction of gas in the aerated composition generally relate in the following way.

| Overrun [%] | Volume fraction gas [vol. %] |
|---|---|
| 10% | 9.1 vol. % |
| 20% | 16.7 vol. % |
| 50% | 33.3 vol. % |
| 100% | 50.0 vol. % |
| 200% | 66.7 vol. % |
| 300% | 75.0 vol. % |
| 500% | 83.3 vol. % |

Preferably the amount of gas-phase used in the process according to the invention (as expressed in volume fraction of gas of the final emulsion) is from 3 to 70 vol. %, more preferably from 5 to 60 vol. %, even more preferably from 15 to 50 vol. %, still even more preferably from 20 to 45% and still even more preferably from 25 to 40 vol. %.

It was surprisingly found that the use of some types of edible gas negatively affect the stability and appearance of the aerated W/O emulsions. For example, it was found that carbon dioxide gas ($CO_2$) results in W/O emulsions having a very coarse appearance, which was not liked by consumers (see FIG. 2). In contrast, use of for example nitrogen gas which differs from carbon dioxide by having a low solubility in vegetable oil and water, results in aerated W/O emulsions having a very smooth surface and otherwise improved stability (see FIG. 1).

Therefore to provide aerated W/O emulsions according to the invention with improved properties, the gas according to the invention has an average solubility in water at 20 degrees Celsius and at 1 bar of pressure of at most 0.75 gram gas per kg water; and an average solubility in sunflower oil at 20 degrees Celsius and at 1 bar of pressure of at most 0.75 gram gas per kg oil.

Preferably the gas-phase used in the process according to the invention comprises nitrogen, oxygen, helium, neon, argon, krypton, xenon or a mixture thereof, more preferably comprises nitrogen, helium or a mixture thereof and even more preferably comprises nitrogen. Preferably the gas-phase used comprises at least 50 vol. %, more preferably 75 vol. %, even more at least 95 vol. % and still even more preferably at least 99 vol. % of said one or more gases, based on the total volume of the gas-phase.

Water-Phase

The water-phase is prepared according to the standard way in accordance with the chosen ingredients. The water-phase of the emulsion may suitably contain a variety of food grade ingredients, such as sodium chloride, acidulant, preservative, flavors, polysaccharides, minerals and vitamins. The water-phase may also comprise liquid oil, for example to aid the inclusion of hydrophobic ingredients in the water-phase. The water-phase may also comprise gelling and/or thickening agents like for example starches, vegetable gums, pectin and gelling proteins suitable for such use like gelatin.

The amount of waster-phase used in the process according to the invention is preferably from 20 to 80 wt. %, more preferably from 30 to 75 wt. %, even more preferably from 40 to 70 wt. % and still even more preferably from 45 to 65 wt. %.

Preferably the water-phase comprises from 0.05 to 4 wt. %, more preferably from 0.1 to 3 wt. %, even more preferably from 0.5 to 2 wt. % and still even more preferably from 0.7 to 1.5 wt. % of salt, based on the weight of the water-phase. Preferably the salt comprises sodium chloride, potassium chloride, calcium chloride or a combination thereof.

Preferably the pH of the water-phase is acidic and more preferably is from 3 to 6, more preferably from 3.5 to 5.5 and even more preferably from 4 to 5.

Preferably the aerated fat-continuous composition according to the invention comprises one or more coloring agents. The amount and types of coloring agents required to obtain a specific color is known to the person skilled in the art and/or by the (commercial) supplier. Preferably the one or more coloring agents used are of a suitable type and amount to provide a yellowish/golden hue, such as to approximate the color of natural dairy butter. This can for example be achieved by adding a suitable amount of (beta)-carotene. An important advantage for using (beta-)carotene as additive is that it is believed that its consumption can contribute to consumer heath, for example as a source of pro-vitamin A. More preferably the one or more coloring agents according to the invention comprises (or essentially is) carotene and more preferably beta-carotene. Even more preferably the aerated fat-continuous composition according to the invention comprises beta-carotene in an amount is from 0.5 to 500 mg/kg (i.e. mg beta-carotene per kg emulsion), still even more preferably from 1 to 100 mg/kg and still even more preferably from 5 to 50 mg/kg. Beta-carotene is commercially available in concentrated form (30% oily suspension) (Supplier: BASF, DSM).

Emulsifiers

Typically emulsifiers are used in the manufacture of W/O emulsions. The Hydrophilic-Lipophilic Balance (HLB) of an emulsifier is a measure of the degree to which it is hydrophilic or lipophilic. The HLB value is a parameter which is describing the solubility of the surfactant. The HLB value is a concept introduced by Griffin in 1950 as a measure of the hydrophilicity or lipophilicity of nonionic surfactants. It can be determined experimentally by the phenol titration method of Marszall; see "Parfumerie, Kosmetik", Vol. 60, 1979, pp. 444-448; and Rompp, Chemistry Lexicon, 8th Edition 1983, p. 1750. An emulsifier having an HLB value of 8 or lower is usually classified as being a water-in-oil promoting emulsifier and as fat soluble. Emulsifiers with an HLB of more than 8 are usually classified as oil-in-water promoting and as water-soluble.

Surprisingly it was found that when a combination of a) monoglyceride, diglyceride and/or polyglycerol ester of fatty acids or a combination thereof, and b) lecithin is used in the process according to the invention, the stability and organoleptic properties of the aerated W/O emulsions made are further improved.

Therefore, preferably in the process according to the invention at least two ingredients are used selected from lecithin, monoglyceride, diglyceride, polyglycerol ester of fatty acids and combinations thereof; wherein the at least two ingredients comprise at least lecithin.

Surprisingly it was also found that said improvement could be further enhanced by use of certain amounts of said ingredients, therefore:

Preferably the edible aerated water-in-oil emulsion according to the invention comprises from 0.01 to 2 wt. %, more preferably from 0.02 to 1 wt. %, even more preferably from 0.03 to 0.5 wt. % of lecithin.

Preferably the edible aerated water-in-oil emulsion according to the invention comprises from 0.01 to 1.0 wt. %, more preferably from 0.05 to 0.5 wt. % and even more preferably from 0.1 to 0.4 wt. % of monoglyceride. Preferably said monoglyceride comprises at least 50 wt. % more preferably 70 wt. % and even more preferably at least 85 wt. % of saturated fatty acids, based on the total weight of monoglyceride. Monoglyceride are commercially available, for example under the trade name Dimodan U/J, Dimodan HP and Dimodan RT, which are commercially available (Supplier: Danisco, Denmark).

Preferably the edible aerated water-in-oil emulsion according to the invention comprises from 0.01 to 4 wt. %, more preferably from 0.05 to 0.3 wt. % and even more preferably from 0.1 to 0.2 wt. % of polyglycerol ester of fatty acids. Polyglycerol ester of fatty acids is commercially available, for example under the trade name PGPR, which is commercially available (Supplier: Danisco, Denmark).

Other Ingredients

The edible aerated W/O emulsion according to the invention may comprise other ingredients, such as flavors (e.g. in addition to salt), coloring, herbs and spices, emulsifiers (e.g. in addition to lecithin) and anti-oxidants.

Hydrophobins

Hydrophobins are described in EP2052628A1 on paragraphs [0025] to [0038] and are relatively novel food additives and unknown by the average consumer, obtained from bacterial and/or fungal sources. Preferably the fat-continuous composition according to the invention comprises less than 0.01 wt. % of hydrophobins, more preferably at most 0.005 wt. % of hydrophobins and even more preferably comprises (essentially) no hydrophobins.

Preferably the aerated fat-continuous composition according to the invention comprises at most 2 wt. %, more preferably at most 0.5 wt. %, even more preferably at most 0.1 wt. % of sugar fatty acid esters, and still even more preferably comprises essentially no sugar fatty acid esters. Sugar fatty acid esters are described in EP0375238 A2.

Product-Type

Surface deformations formed during storage in aerated W/O emulsions can be observed in many types of emulsion, such as solid or semi-solid compositions, but even in compositions which are considered liquid. For example, many liquid aerated fat-continuous compositions are liquid (when mechanically agitated), but behave as a solid or semi-solid compositions during storage. In this sense they behave ketchup-like and are susceptible to surface deformations during storage.

Preferably the edible aerated water-in-oil emulsion manufactured according to the invention is an aerated liquid margarine, an aerated wrapper or an aerated tub-spread, preferably an aerated tub-spread or an aerated wrapper and more preferably an aerated tub-spread.

Aerated tub-spreads and aerated wrappers are examples of solid and semi-solid emulsions.

Preferably the aerated W/O emulsion according to the invention has a Stevens value, as measured according to the procedure set-out below at 10 degrees Celsius of from 20 to 500, more preferably from 30 to 400, even more preferably from 35 to 250, still even more preferably from 40 to 200, still even more preferably form 45 to 150 and still even more preferably form 50 to 100.

Step a)

At step a) the micronized fat powder comprising hardstock fat, the liquid oil, the water-phase and the gas-phase are mixed to form an aerated W/O emulsion. The mixing of ingredients can be done in any suitable order. For example, first a slurry of the micronized fat powder and liquid oil may be formed, next the water-phase may be added followed by (post-)aerating the emulsion with the gas-phase according to the invention.

It was surprisingly found that the stability, hardness and spreadability of the aerated W/O emulsions made could be further improved in case the micronized fat powder comprising hardstock fat is added no earlier than the gas-phase, water-phase and the liquid oil.

Without wishing to be bound by theory it is believed that adding the fat powder at a time both gas-bubbles and water-droplets are present leads to a more equal distribution of fat powder particulates over the water-droplets and the gas-bubbles. This is more equal stabilization of both the gas- and the water-phase is believed to underlie the further improved properties.

In comparison it is observed that a process wherein first an emulsion is made comprising the liquid oil, fat powder and the water-phase, followed by post-aeration of said emulsion to introduce the gas-phase, leads to less stable aerated emulsions according to the invention. Furthermore it is observed that first providing a mixture of the liquid oil, fat powder and the gas-phase, followed by post-mixing water-phase will also lead to slightly less stable aerated emulsion according to the invention. However, these comparative processes still yield aerated emulsions which have still improved stability, firmness and appearance compared to prior art emulsions.

Therefore, preferably in the process according to the invention at step a) the liquid oil, the water-phase and the gas-phase are emulsified; and the fat powder is added during or after said emulsification.

The mixing at step a) can be performed using any suitable mixer known in the art of emulsion making. Preferably the mixing at step a) is high shear mixing.

Preferably the mixing at step a) involves one or more C-units (e.g. pin-stirrer), A-units (e.g. surface scrapped heat exchanger), Trefa-mixers or a combination thereof. Such mixers can be used to aerate the emulsion as well (e.g. by mixing while injecting gas under pressure).

More preferably the mixing at step a) involves at least one C-unit with an internal volume of from 0.5 to 2.5 liter; operating at from 1000 to 3000 rpm (rounds per minute) and even more preferably operating at about 1500 rpm.

Degassing of the Fat Powder

Micronized fat powder is typically made using a supercritical carbon dioxide gas, as described in WO2005/014158. The removal of any gas not according to the invention, such as carbon dioxide for the fat powder further improves the stability, spreadability and firmness of the emulsions made. This can be done in any suitable manner, such as by subjecting the fat powder to (partial) vacuum, which removes carbon dioxide by degassing. Preferably in the process according to the invention the micronized fat powder comprising hardstock fat is subjected to at least partial vacuum. This reduces the amount of any remaining carbon dioxide gas (and optionally other gas not according to the invention).

Edible Aerated Water-In-Oil Emulsion

It was observed that edible aerated W/O emulsions made according to the process of the invention have improved stability, hardness, spreadability and appearance compared to products of the same composition, but not made according to the invention. This is particularly apparent after subjecting aerated W/O emulsions to temperature cycle (stress) tests.

The precise structural features of the aerated W/O emulsions according to the invention, which underlie these improved characteristics are not known. Therefore, in a second aspect the invention relates to edible aerated water-in-oil emulsion obtainable by the process of the invention.

Good stability of an aerated W/O emulsion can be characterized by a water-phase having a small average water droplet size (e.g. as expressed in D3,3) and a small size distribution (e.g. as expressed in e-sigma), a stable amount of gas-phase (e.g. as expressed in vol. %) and a stable gas-bubble size.

Preferably the aerated W/O emulsion according to the invention has an average water droplet size as expressed in D3,3, even after subjection to a B2-cycle test, of at most 15, more preferably of at most 10 and even more preferably of at most 8.0. Preferably the aerated edible water-in-oil emulsions according to the invention have a water droplet size distribution as expressed in e-sigma, even after subjection to a B2-cycle test, of at most 3.5, more preferably of at most 3.0, even more preferably of at most 2.5 and still even more preferably of at most 2.0.

Preferably the aerated W/O emulsion according to the invention retains at least 75 vol. %, more preferably at least 80 vol. %, even more preferably at least 85 vol. % and still even more preferably at least 90 vol. % of the gas-phase, based on the total volume of gas contained by the emulsion right after production, after subjection to a B2-cycle test.

Preferably the aerated W/O emulsion according to the invention has a gas-phase wherein the average gas-bubbles size increases at most 25% (as measured in D3,2), more preferably at most 20%, even more preferably at most 15%, even still even more preferably at most 10%, after subjection to a B2-cycle test.

Preferably the edible aerated water-in-oil emulsions according to the invention have a Stevens value at 10 degrees Celsius after subjection to a B2 temperature-cycle test of from 40-60.

The D3,3, e-sigma of the water-phase and the vol. % gas and D3,2 of the gas-phase of the are measured as set out below in the Examples section.

In a B2-cycle test the spreads are subjected to the following temperature regime as set-out in Table 2 below.

Preferred aspects of the product disclosed in here in the context of the first aspect of the invention (i.e. the process) are also applicable to the second aspect of the invention (i.e. the product obtainable by the process), mutatis mutandis (and visa versa). For example preferred levels of water-phase used in context of the process according to the invention also apply to preferred levels of water-phase comprised by the emulsion according to the invention.

The invention is now illustrated by the following non limiting examples.

EXAMPLES

Spreadability

Spreadability, as measured in spreading score, is determined according to the following protocol. A flexible palette knife is used to spread a small amount of the spread on to fat free paper. The spreading screen is evaluated according to standardized scaling. A score of 1 represents a homogeneous and smooth product without any defects, a 2 refers to the same product but then with small remarks as slightly inhomogeneous or some vacuoles, a 3 refers to the level where defects become almost unacceptable, like loose moisture or coarseness during spreading. A score of 4 or 5 refers to unacceptable products, where the 4 refers to a product still having some spreading properties, but an unacceptable level of defects.

Water Droplet Size Distribution of W/O Emulsions

The normal terminology for Nuclear Magnetic Resonance (NMR) is used throughout this method. On the basis of this method the parameters D3,3 and exp(σ) of a lognormal water droplet size distribution can be determined. The D3,3 is the volume weighted mean droplet diameter as typically measured in micrometer and exp(σ) (e-sigma) is the standard deviation of the logarithm of the droplet diameter. The NMR signal (echo height) of the protons of the water in a water-in-oil emulsion are measured using a sequence of 4 radio frequency pulses in the presence (echo height E) and absence (echo height E*) of two magnetic field gradient pulses as a function of the gradient power. The oil protons are suppressed in the first part of the sequence by a relaxation filter. The ratio (R=E/E*) reflects the extent of restriction of the translational mobility of the water molecules in the water droplets and thereby is a measure of the water droplet size. By a mathematical procedure—which uses the log-normal droplet size distribution—the parameters of the water droplet size distribution D3,3 (volume weighed geometric mean diameter) and a (distribution width) are calculated.

A Bruker magnet with a field of 0.47 Tesla (20 MHz proton frequency) with an air gap of 25 mm is used (NMR Spectrometer Bruker Minispec MQ20 Grad, ex Bruker Optik GmbH, DE).

Volume Fraction of Gas

The amount of gas that is trapped in the aerated fat-continuous composition can be described as the overrun or as volume fraction of air, as explained above. The volume fraction of gas (which is air in the below experiments) of each sample was determined gravimetrically. The mass of a vessel with a volume of 30 ml was filled with non-aerated fat-continuous composition to determine $m_{SUS}$. The same vessel is then filled with aerated composition, and the mass measured again to determine $m_F$. The volume fraction of air can then be calculated.

Gas-Bubble Size and Distribution of Aerated W/O Emulsions

Emulsions were imaged with a SkyScan 1172-A high-resolution desktop μCT system. An XRT (X-Ray Tomography) scan creates a series of x-ray photographs (projection images) of an object placed on a rotating stage. The distance between the object and the X-ray source defines the magnification of the projection. Magnifying the object allows to increase the spatial resolution. The final resolution also depends on the detector. The detector has a fixed number of pixels and each pixel has a well-defined size. The actual resolution is limited to about 2 micrometer.

All (2D) projection images are taken from slightly different angles and are stored on a disk, and later used for a so called tomographic reconstruction. This is a mathematical procedure to obtain a stack of cross-sectional images, which make-up a 3D representation of the object. Such a stack of images can be visualized using 3D rendering software. The 3D images can be used to determine gas bubble sizes.

The SkyScan NRECON software (V1.6.4.8) is being used for reconstruction of the 2D projection images into a stack of horizontal slices yielding a 3D model. The images can be viewed, processed and analysed using image processing software (CTAn (V1.11.10) from SkyScan and Avizo Fire V7.0 from the Visualization Sciences Group).

For analysis of the emulsions, a removable plastic tube having an internal diameter of 7 millimeter and a height of about 6 centimeter is filled with the emulsion to be measured. The tomography results in a 3-D structure that can be displayed in different planes. From the 3-D bubble distribution, an estimate of the gas bubble size in the sample can be made. By making images before and after storage of emulsions the influence of the storage on the gas bubbles can be investigated.

After reconstruction of the projection images, the resulting 3D stack of images are binarised using a threshold value such that the overrun obtained in the image analysis matched that of the product. Subsequently, bubbles that are apparently coalesced or touching each other (e.g. because the lamella between two bubbles was too thin to be identified during the threshold are separated in 3D by using a watershed transform of the Euclidean distance map of the inverted binary images (using Matlab/DipLib software).

The volume of the somewhat irregular bubbles is determined by adding up the voxels (i.e. 3d pixels), and an equivalent bubble diameter was determined by equating the volume of the bubble with a hypothetical sphere (having the equivalent bubble diameter) with the same volume.

From this analysis can be calculated the mean diameter value based on:
D1,0=arithmetic or number mean
D3,2=volume/surface mean (also called the Sauter mean)
D4,3=the mean diameter over volume (also called the DeBroukere mean)

The Micro-CT imaging machine was operated with the following settings:

| SCAN | |
| --- | --- |
| Power/Current | 60 KV/167 μA |
| Pixel Size | 2.2 μm: near |
| Resolution | 400 × 2096 pixels |
| Rotation step size | 0.33 degrees |
| Rotation | 180 degrees |
| Frame Averaging | 3x |
| Stage Height | 18 mm |
| RECONSTRUCTION | |
| Smoothing | 4 |
| Ring Artifacts | 20 |
| Beam Hardening | 80 |
| Dynamic Range | 0:0.05 |

Stevens Value

A Steven value indicates the hardness or firmness of a product. The Stevens value was measured with a Stevens penetrometer (Brookfield LFRA Texture Analyser (LFRA 1500), ex Brookfield Engineering Labs, UK) equipped with a stainless steel probe with a diameter of 6.35 mm and operated in "normal" mode. The probe is pushed into the product at a speed of 2 mm/s, a trigger force of 5 gram from a distance of 10 mm. The force required is read from the digital display and is expressed in grams.

To measure the Stevens value at 10 degrees Celsius a W/O emulsion is first stored at 10 degrees Celsius for 24 hours before measuring.

Manufacture of Edible Aerated W/O Emulsions (Example 1 to 3 and Comparatives A and B)

The W/O emulsions according to Examples 1 to 3 and Comparative A and B were made with a composition as set out in Table 1.

TABLE 1

Composition of aerated W/O emulsions of Examples 1 to 3 and Comparatives A and B (numbers represent wt. % for ingredients, and vol. % for the amount of nitrogen gas).

|  | Ex. 1 | Ex. 2 | Ex. 3 | Comp. A | Comp. B |
|---|---|---|---|---|---|
| Fat-Phase | | | | | |
| [1]inES48 fat powder | 6.0 | 6.0 | 6.0 | — | — |
| [2]inES48 | — | — | — | 6.0 | 6.0 |
| Liquid vegetable oil | 33.5 | 33.5 | 33.5 | 33.5 | 33.5 |
| [3]Dimodan RT | 0.35 | 0.35 | 0.35 | 0.35 | 0.35 |
| [4]Sunlec M | 0.05 | 0.05 | 0.05 | 0.05 | 0.05 |
| [5]PGPR | 0.04 | 0.04 | 0.04 | 0.04 | 0.04 |
| beta-carotene | 0.10 | 0.10 | 0.10 | 0.10 | 0.10 |
| Flavors | 0.025 | 0.025 | 0.025 | 0.025 | 0.025 |
| Water-Phase | | | | | |
| NaCl | 0.10 | 0.10 | 0.10 | 0.10 | 0.10 |
| Potassium sorbate | 0.080 | 0.080 | 0.080 | 0.080 | 0.080 |
| Water | Balance | Balance | Balance | Balance | Balance |
| Gas-phase | | | | | |
| Nitrogen gas ($N_2$) | 20 vol. % | 35 vol. % | 20 vol. % | 20 vol. % | 35 vol. % |

[1]inES48 is an interesterified blend of 65% dry fractionated palm oil stearin with an Iodine Value of 14 and 35% palm kernel oil. For examples 1 to 3 a fat powder of inES48 was used that was obtained using a supercritical melt micronisation process. The fat-powder was degassed prior to use.
[2]For comparatives A and B the inES48 was melted during the manufacturing process (i.e. not used in the form of micronized fat powder).
[3]Dimodan RT: molecularly distilled mono-/diglyceride mixture derived from partially hardened rapeseed oil (90% monoglyceride) (Supplier: Danisco, Denmark).
[4]Sunlec M (Supplier: Unimills B.V., the Netherlands) is lecithin comprising 36 wt. % phosphatidylcholine, 14 wt. % phosphatidylethanolamine and 35 wt. % phosphatidylinositol.
[5]PGPR: polyglycerol polyricinoleate (Supplier: Danisco, Denmark).

Process to Manufacture Aerated W/O Emulsions Example 1 and 2

Cold oil, lecithin, colorants and flavors were added to a stirring tank (Fryma vessel) and mixed. A stock solution of the Dimodan RT and PGPR was prepared by mixing these with about 1% of the liquid oil and heating it up to 75 degrees Celsius. The stock solution, cooled to about 70 degrees Celsius, was added to the cold oil, with a temperature of about 14 degrees Celsius, and mixed. Next, fat powder was added to the oil and mixed-in under partial vacuum. The fat powder and oil mixture is mixed under high shear, using a reflux pipe until an oil-slurry was obtained which appeared smooth and transparent. The maximum temperature increase observed due to mixing was about 21.5 degrees Celsius. Before being fed into the C-unit see below the temperature of the oil-slurry was about 18 degrees Celsius.

The water-phase was prepared by dissolving the water-phase ingredients in the water and adjusting the pH to about 4.6 using 50 wt. % lactic acid solution. Before being fed into the C-unit, see below, the water-phase was cooled to about 12-13 degrees Celsius.

The thus prepared oil-slurry and water-phase were fed to a C-unit (volume 1500 ml) operating at a flow-rate of 100 kg (60 kg of water-phase and 40 kg oil-phase) per hour and at 1500 rpm.

Nitrogen flow was fed into the C-unit together with the oil-slurry and the water-phase at a flow rate adjusted to achieve a desired overrun level.

Process to Manufacture Emulsions of Example 3

Cold oil, lecithin, colorants and flavors were added to a stirring tank (Fryma vessel) and mixed. A stock solution of the Dimodan RT and PGPR was prepared by mixing these with about 1% of the liquid oil and heating it up to 75 degrees Celsius. The stock solution, cooled to about 70 degrees Celsius, was added to the cold oil, with a temperature of about 14 degrees Celsius, and mixed. Next, fat powder was added to the oil and mixed-in under vacuum. The fat powder and oil mixture is mixed under high shear, using a reflux pipe until an oil-slurry was obtained which appeared smooth and transparent. The maximum temperature increase observed due to mixing was about 21.5 degrees Celsius. Before being fed into the C-unit see below the temperature of the oil-slurry was about 18 degrees Celsius.

The water-phase was prepared by dissolving the water-phase ingredients in the water and adjusting the pH to about 4.6 using 50 wt. % lactic acid solution. Before being fed into the C-unit, see below, the water-phase was cooled to about 12-13 degrees Celsius.

The thus prepared oil-slurry and water-phase were fed to a C-unit (volume 1500 ml) operating at a flow-rate of 100 kg (60 kg of water-phase and 40 kg oil-phase) per hour and at 1500 rpm.

The resulting water-in-oil emulsion was post-aerated by injecting $N_2$ gas at a pressure of around 50 Bar while mixing. The gas phase was mixed in the emulsion using a Trefa mixer (Trefa T100, Angerlo, the Netherlands). The Trefa mixer consists of a premixing chamber and a rotor containing multiple rows of pins operating at a rotor speed of 300 rpm.

Process to Manufacture Emulsions of Comparative A and B

All fat-phase ingredients, including the fat powder comprising hardstock fat were added to rapeseed oil and heating to 60 degrees Celsius, which melted the hardstock fat. (The emulsifiers and PGPR were first pre-dissolved in a small amount of rapeseed oil heated by heating to 80 degrees Celsius, before being adding to the rapeseed oil at 60 degrees Celsius.)

In a separate vessel, the water-phase ingredients were added and dissolved in the water by heating to 60 degrees Celsius. Subsequently the pH was adjusted to 4.6 by adding citric acid (50 wt. % aqueous citric acid solution was used).

A premix of the water-in-oil type was prepared by mixing the above fat-phase and water-phase in a double walled stainless steel vessel equipped with a stirrer operating at about 80 rpm and one baffle kept at 60 degrees Celsius. This mixture was pumped through a Pasteurization Unit, a set of Scraped Surface Heat Exchangers (A-units), a pin stirrer (C-unit) and a Trefa mixer. The sequence being as follows: Tank-pump-flow meter-pressure meter-Pasteurisor-C-A-A-A-C—$N_2$-injection-Trefa mixer. Wherein the A-units were fitted with a rotor equipped with two stainless steel scraper blades operating at 800 rpm having an annulus of 3 mm and a volume of 18 cubic cm and wherein the C-unit had a volume of 1.5 liters and was fitted with a rotor and stator both having two rows of 4 pins and operating at 150 rpm. The throughput was about 100 kg per hour with a temperature profile of resp. about 35, 20, 18, 12, 14 degrees Celsius in the C-A-A-A-C units.

The W/O emulsions were aerated to the level as shown in Table 1. Aeration was carried out by injecting N2 gas at a pressure of around 50 Bar while mixing. The gas phase was mixed in the emulsion using a Trefa mixer (Trefa T100, Angerlo, the Netherlands). The Trefa mixer consists of a premixing chamber and a rotor containing multiple rows of pins operating at a rotor speed of 300 rpm.

All products of Examples 1 to 3 and Comparatives A and B were packaged in 250 ml tubs and stored at 5 degrees Celsius. It is stressed that in the process of Comparatives A and B that although fat powder was used it has been melted during the process. In comparison, in the process used to manufacture the Examples, the fat-powder was not subjected to temperatures at which the hardstock fat comprised by the fat powder (substantially) melts.

Results

After the spreads were manufactured, they were subjected to the temperature cycle (stress test) conditions as described in Table 2. After said subjection the water droplet size distribution (D3,3 and e-sigma), Stevens value and spreading score was measured (Table 3). In addition, the gas-bubble size of selected spreads was also measured (Table 4).

TABLE 2

Temperature cycle-tests.

| Cycle-test | Temperature (stress) conditions after production |
| --- | --- |
| A | 14 days at 5° C.; 2 days at 20° C.; 4 days at 5° C. followed by 1 day at 10° C. before measuring |
| A1 | As 'A', but in addition three cycles of (1 day at 20° C.; 1 day at 5° C.) followed by 1 day at 10° C. before measuring |
| A2 | As 'A', but in addition three cycles of (1 day at 25° C.; 1 day at 5° C.) followed by 1 day at 10° C. before measuring |
| B | 14 days at 15° C.; 2 days at 25° C.; 4 days at 15° C. followed by 1 day at 10° C. before measuring |
| B1 | As 'B', but in addition three cycles of (1 day at 20° C.; 1 day at 5° C.) followed by 1 day at 10° C. before measuring |
| B2 | As 'B', but in addition three cycles of (1 day at 25° C.; 1 day at 5° C.) followed by 1 day at 10° C. before measuring |
| C | 14 days at 15° C.; 2 days at 30° C.; 4 days at 15° C. followed by 1 day at 10° C. before measuring |
| C1 | As 'C', but in addition three cycles of (1 day at 20° C.; 1 day at 5° C.) followed by 1 day at 10° C. before measuring |
| C2 | As 'C', but in addition three cycles of (1 day at 25° C.; 1 day at 5° C.) followed by 1 day at 10° C. before measuring |
| CC | Three cycles of (1 day at 25° C.; 1 day at 5° C.) followed by three cycles of (1 day at 25° C.; 1 day at 5° C.) before measuring |

TABLE 3

Analysis of spreads after production and temperature-cycle treatment.

| | Ex. 1 | Ex. 2 | Ex. 3 | Comp. A | Comp. B |
| --- | --- | --- | --- | --- | --- |
| One week at 10 degrees Celsius | | | | | |
| D3,3 | 2.8 | 2.8 | 3.8 | 4.2 | 4.2 |
| e-sigma | 1.6 | 1.6 | 1.9 | 2.8 | 2.6 |
| Stevens value | 45 | 65 | 50 | 50 | 45 |
| Spreadability score | 1 | 1 | 1 | 1 | 1 |
| Spreads analysis after A-cycle | | | | | |
| D3,3 | 3.6 | 3.6 | 4.1 | 7.2 | 8.2 |
| e-sigma | 1.5 | 1.6 | 1.9 | 3.3 | 3.6 |
| Stevens value | 60 | 50 | 65 | 55 | 40 |
| Spreadability score | 1 | 1 | 1 | 1 | 1 |
| Spreads analysis after A1-cycle | | | | | |
| D3,3 | 3.8 | 4.0 | 4.4 | 10.8 | 12.9 |
| e-sigma | 1.5 | 1.6 | 1.8 | 4.1 | 4.6 |
| Stevens value | 60 | 50 | 65 | 45 | 40 |
| Spreadability score | 1 | 1 | 1 | 1 | 1 |
| Spreads analysis after A2-cycle | | | | | |
| D3,3 | 5.0 | 5.4 | 5.9 | 21.0 | 21.0 |
| e-sigma | 1.5 | 1.6 | 1.7 | 4.2 | 4.2 |
| Stevens value | 45 | 45 | 55 | 35 | 25 |
| Spreadability score | 1 | 1 | 1 | 3 | 3 |
| Spreads analysis after B-cycle | | | | | |
| D3,3 | 4.6 | 4.9 | 5.6 | 15.5 | 14.8 |
| e-sigma | 1.5 | 1.6 | 1.7 | 3.7 | 3.7 |
| Stevens value | 55 | 50 | 55 | 35 | 30 |
| Spreadability score | 1 | 1 | 1 | 3 | 3 |
| Spreads analysis after B1-cycle | | | | | |
| D3,3 | 4.7 | 5.0 | 5.7 | 18.0 | 17.3 |
| e-sigma | 1.5 | 1.6 | 1.7 | 4.2 | 3.9 |
| Stevens value | 55 | 40 | 60 | 35 | 30 |
| Spreadability score | 1 | 1 | 1 | 4 | 4 |
| Spreads analysis after B2-cycle | | | | | |
| D3,3 | 5.0 | 5.3 | 6.1 | 23.0 | 18.4 |
| e-sigma | 1.5 | 1.6 | 1.7 | 4.0 | 3.7 |
| Stevens value | 55 | 45 | 60 | 35 | 30 |
| Spreadability score | 1 | 1 | 1 | 3 | 4 |
| Spreads analysis after C-cycle | | | | | |

TABLE 3-continued

Analysis of spreads after production and temperature-cycle treatment.

|  | Ex. 1 | Ex. 2 | Ex. 3 | Comp. A | Comp. B |
|---|---|---|---|---|---|
| D3,3 | 6.4 | 7.3 | 7.6 | 17.9 | 21.6 |
| e-sigma | 1.5 | 1.6 | 1.7 | 3.2 | 3.4 |
| Stevens value | 50 | 50 | 55 | 25 | 25 |
| Spreadability score | 1 | 1 | 1 | 1 | 1 |
| Spreads analysis after C1-cycle | | | | | |
| D3,3 | 6.7 | 7.4 | 7.7 | 21.4 | 54.0 |
| e-sigma | 1.5 | 1.6 | 1.7 | 3.2 | 4.6 |
| Stevens value | 55 | 45 | 50 | 30 | 20 |
| Spreadability score | 1 | 1 | 1 | 3 | 3 |
| Spreads analysis after C2-cycle | | | | | |
| D3,3 | 7.3 | 6.1 | 8.0 | 32.0 | 28.0 |
| e-sigma | 1.6 | 1.5 | 1.7 | 3.7 | 3.5 |
| Stevens value | 60 | 45 | 60 | 25 | 20 |
| Spreadability score | 1 | 1 | 1 | 4 | 5 |
| Spreads analysis after CC-cycle | | | | | |
| D3,3 | 5.9 | 4.3 | n.d. | 23.0 | 19.0 |
| e-sigma | 1.5 | 1.5 | n.d. | 3.3 | 3.0 |
| Stevens value | 50 | 40 | n.d. | 30 | 20 |
| Spreadability score | 1 | 1 | n.d. | 3 | 4 | n.d.: not determined

TABLE 4 gas-bubble size of spreads subjected to B2-cycle'

|  | Ex. 2 | Comp. B |
|---|---|---|
| One week at 10 degrees Celsius | | |
| Vol. % Air | 43.0 | 40.7 |
| D1,0 | 28.4 | 29.7 |
| D3,2 | 52.5 | 50.1 |
| D4,3 | 94.8 | 100.8 |
| Spreads analysis after B2-cycle | | |
| Vol. % Air | 43.1 | 14.8 |
| D1,0 | 27.6 | 18.0 |
| D3,2 | 45.1 | 84.5 |
| D4,3 | 182.1 | 447.6 |

As shown by the results in Table 3 and 4, aerated W/O emulsions made according to the invention (Ex. 1, Ex. 2 and Ex. 3) with micronized fat powder have greater stability, firmness and improved spreadability when compared to votator made aerated W/O emulsions (Comparative A and B). This is particular apparent after subjection to temperature-cycle stress tests.

What is further shown in Table 3 is that in case fat-powder is added to a (pre-)emulsion comprising both a dispersed water-phase and a dispersed gas-phase (Ex. 1, Ex. 2); the stability and firmness is further improved. This is made clear when compared to aerated emulsions wherein the fat powder was added to an (pre-)emulsion comprising only a dispersed water-phase and liquid oil, and wherein the emulsion was subsequently (post-) aerated (Ex. 3).

Manufacture of Edible Aerated W/O Emulsion Spreads (Comparative D and Comparative C)

Aerated W/O emulsions according to Comparatives D and C were made with a composition as set out in Table 5.

TABLE 5

Composition of aerated W/O emulsions of Comparatives C and D (numbers represent wt. % for ingredients unless otherwise indicated).

|  | Comp. D | Comp. C |
|---|---|---|
| Fat-Phase | | |
| [1]inES01 | 22.4 | 22.4 |
| Liquid vegetable oil | 16.3 | 16.3 |
| [2]Dimodan HP | 0.20 | 0.20 |
| [3]Sunlec M | 0.10 | 0.10 |
| [4]PGPR | 0.10 | 0.10 |
| beta-carotene (1% in oil) | 0.05 | 0.05 |
| Flavors | trace | Trace |
| Water-Phase | | |
| NaCl | 0.50 | 0.50 |
| [5]Colflo 67 | 1.4 | 1.4 |
| Buttermilk powder | 1.0 | 1.0 |
| Potassium sorbate | 0.15 | 0.15 |
| Lactic acid (20% solution) | 0.24 | 0.24 |
| Water | Balance | Balance |
| Gas-phase | | |
| Nitrogen | 35 vol. % | — |
| Carbon dioxide | — | 35 vol. % |

[1]inES01: interesterified blend of 35% dry fractionated palm stearin with iodine value of about 34 and a melting point of 53 degrees Celsius; 36% of wet fractionated shea olein and 29% of palm kernel fat. inES01 was not used as fat powder.
[2]Dimodan HP: molecularly distilled mono-/diglyceride mixture derived from fully hardened palm oil (90% monoglyceride) (Supplier: Danisco, Denmark).
[3]Sunlec M (Supplier: Unimills B.V., the Netherlands) is lecithin comprising 36 wt. % phosphatidylcholine, 14 wt. % phosphatidylethanolamine and 35 wt. % phosphatidylinositol.
[4]PGPR: polyglycerol polyricinoleate (Supplier: Danisco, Denmark).
[5]Colflo 67: waxy corn starch, modified using cross-linking by acetic anhydride and substituted by adipic acid anhydride.

Process to Manufacture Comparatives C and D

The Comparatives C and D were made according to the process set-out for Comparatives A and B.

Results of Comparatives C and D

The appearance of the aerated W/O emulsion spreads was evaluated directly after production and after subjection to A1-, A2-, B1- and B2-(temperature) cycles. FIG. 1 is a photograph taken of the aerated emulsion according to Comparative D after a B2-cycle test. FIG. 2 is a photograph take of the aerated emulsion according to Comparative C, also taken after B2-cycle test. The aerated emulsion of Comparative D was made with nitrogen gas as the gas-phase shows improved smooth appearance of the surface and has finely distributed gas bubbles. This was the case right after production and after subjection to A1-, A2-, B1- and B2-temperature cycle tests. In contrast, the aerated emulsions according to Comparative C which are made with carbon dioxide as gas-phase show a much coarser appearance with major surface defects, including large cracks on the surface of the product. Clearly, gases with relatively high water- and oil solubility such as carbon dioxide (and not according to the invention) lead to poor appearance. Such poor appearance is undesirable as it leads to reduced consumer acceptance (and loss of sales).

The invention claimed is:
1. A process for manufacturing an edible aerated water-in-oil emulsion comprising:
from 0.5 to 50 wt. % of a micronized fat powder comprising hardstock fat;
from 10 to 85 wt. % of a liquid oil;
from 10 to 85 wt. % of a water-phase;

from 2 to 100 vol. % of a gas-phase; wherein the gas-phase comprises a gas having (i) an average solubility in water at 20 degrees Celsius and at 1 bar of pressure of at most 0.75 gram gas per kg water; (ii) an average solubility in sunflower oil at 20 degrees Celsius and at 1 bar of pressure of at most 0.75 gram gas per kg oil; and (iii) wherein the gas-phase comprises at least 50 vol. % of nitrogen, oxygen, helium, neon, argon, krypton, xenon, or a mixture thereof, based on the total volume of the gas-phase;

comprising the following steps:
a) forming an emulsion by mixing the liquid oil, and the water-phase; and
b) introducing the gas-phase by post-aeration of the emulsion; and
c) adding the micronized fat powder to the aerated emulsion, wherein the micronized fat powder is not subjected to temperatures at which the hardstock substantially melts;
to provide the edible aerated water-in-oil emulsion.

2. The process of claim 1, wherein the micronized fat powder is produced by supercritical melt micronisation.

3. The process of claim 1, wherein the amount of micronized fat powder comprising hardstock fat is from 1 to 20 wt. %.

4. The process of claim 1, wherein the hardstock fat comprised by the fat powder has a solid fat content profile of:
N10 from 50 to 100,
N20 from 26 to 95, and
N35 from 5 to 60.

5. The process of claim 1, wherein the amount of gas-phase is from 3 to 70 vol. %.

6. The process of claim 1, wherein the amount of liquid oil is from 15 to 70 wt. %.

7. The process of claim 1, wherein a combination comprising
a) a monoglyceride, a diglyceride, or a polyglycerol ester of fatty acids, or a combination thereof; and
b) lecithin are added as ingredients.

8. The process of claim 1, wherein the micronized fat powder comprising hardstock fat is subjected to at least partial vacuum.

9. An edible aerated water-in-oil emulsion manufactured by the process of claim 1.

10. The emulsion of claim 9, wherein the emulsion is an aerated liquid margarine, an aerated wrapper or an aerated tub-spread.

11. The emulsion of claim 10, wherein the mixing in step a) is performed using one or more C-units, A-units, Trefa-mixers or a combination thereof.

12. The process of claim 1, wherein the amount of gas-phase is at least 50 vol. %.

13. The process of claim 1, wherein the amount of gas-phase is at least 66.7 vol. %.

14. The process of claim 1, wherein the amount of gas-phase is from 50 to 70 vol. %.

15. The process of claim 1, wherein the micronized fat powder is added to the emulsion in step c) after the emulsion is fully aerated, and the amount of gas-phase is at least 33.3 vol. %.

16. The process of claim 1, wherein the micronized fat powder is added to the emulsion in step c) after the emulsion is fully aerated, and the amount of gas-phase is at least 50 vol. %.

17. A process for manufacturing an edible aerated water-in-oil emulsion comprising:
from 0.5 to 50 wt. % of a micronized fat powder comprising hardstock fat;
from 10 to 85 wt. % of a liquid oil;
from 10 to 85 wt. % of a water-phase;
at least 33.3 vol. % of a gas-phase; wherein the gas-phase comprises a gas having (i) an average solubility in water at 20 degrees Celsius and at 1 bar of pressure of at most 0.75 gram gas per kg water; and (ii) an average solubility in sunflower oil at 20 degrees Celsius and at 1 bar of pressure of at most 0.75 gram gas per kg oil;
comprising the following steps:
a) forming an emulsion by mixing the liquid oil, and the water-phase; and
b) introducing the gas-phase by post-aeration of the emulsion; and
c) adding the micronized fat powder to the aerated emulsion, wherein the micronized fat powder is not subjected to temperatures at which the hardstock substantially melts;
to provide the edible aerated water-in-oil emulsion.

18. A process for manufacturing an edible aerated water-in-oil emulsion comprising:
from 0.5 to 50 wt. % of a micronized fat powder comprising hardstock fat;
from 10 to 85 wt. % of a liquid oil;
from 10 to 85 wt. % of a water-phase;
at least 33.3 vol. % of a gas-phase;
comprising the following steps:
a) forming an emulsion by mixing the liquid oil, and the water-phase; and
b) introducing the gas-phase by post-aeration of the emulsion; and
c) adding the micronized fat powder to the aerated emulsion, wherein the micronized fat powder is not subjected to temperatures at which the hardstock substantially melts;
to provide the edible aerated water-in-oil emulsion.

* * * * *